United States Patent
Hinterberger

(10) Patent No.: US 6,791,986 B1
(45) Date of Patent: *Sep. 14, 2004

(54) METHOD FOR TRANSMITTING VOICE INFORMATION IN ATM CELLS

(75) Inventor: Christian Hinterberger, Holzkirchen (DE)

(73) Assignee: Siemens Aktiengesellschaft, Munich (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/341,914

(22) PCT Filed: Jan. 13, 1998

(86) PCT No.: PCT/DE98/00108

§ 371 (c)(1),
(2), (4) Date: Jul. 20, 1999

(87) PCT Pub. No.: WO98/33354

PCT Pub. Date: Jul. 30, 1998

(30) Foreign Application Priority Data

Jan. 22, 1997 (DE) .......................... 197 02 141

(51) Int. Cl.[7] .................................................. H04J 3/16
(52) U.S. Cl. .................................................. 370/395.61
(58) Field of Search ........................... 370/395.6, 395.61

(56) References Cited

U.S. PATENT DOCUMENTS

| | | | |
|---|---|---|---|
| 4,999,835 A | * | 3/1991 | Lagoutte ...................... 370/389 |
| 5,425,029 A | * | 6/1995 | Hluchyj et al. ............. 370/235 |
| 5,446,726 A | | 8/1995 | Rostoker et al. |
| 5,577,039 A | | 11/1996 | Won et al. |
| 5,638,365 A | * | 6/1997 | Duault et al. ............. 370/236.1 |
| 5,883,893 A | * | 3/1999 | Rumer et al. ............. 370/395.6 |
| 5,946,309 A | * | 8/1999 | Westberg et al. ......... 370/395.3 |
| 6,061,820 A | * | 5/2000 | Nakakita et al. ........ 370/395.65 |
| 6,079,042 A | * | 6/2000 | Vaman et al. ................ 714/755 |
| 6,108,336 A | * | 8/2000 | Duault et al. ............. 370/395.6 |
| 6,118,763 A | * | 9/2000 | Trumbull ..................... 370/231 |

FOREIGN PATENT DOCUMENTS

EP      0 725 506       7/1996

OTHER PUBLICATIONS

L Gl Cuthbert et al, "ATM the Broadband Telecommunications Solution" (1993), IEE Telecommunications Series 29, pp. 17–31.

Audet et al, "AAL5 Voice in Private Networks" (1996), ATM Forum 96–950, pp. 1–3.

Jackson, "VTOA AAL5 Format Proposal", (1996), ATM FOrum 96–955, pp. 1–5.

* cited by examiner

Primary Examiner—Hassan Kizou
Assistant Examiner—Dmitry Levitan
(74) Attorney, Agent, or Firm—Morrison & Foerster LLP

(57) ABSTRACT

The interworking of voice information in ATM cells is presently provided according to the standardizations of the ITU in the AAL1 adaption method. Specific properties of the voice information are taken into consideration therein. For interworking and transmission of other information data, further adaption methods such as, for example, the AAL5 method are provided. Here, the specific conditions of voice transmissions are not taken into consideration. In order to be able to implement the interworking and transmission of voice information according to the AAL5 standard as well, the AAL5 header is now inventively co-linked into the AAL5 information part of an ATM cell.

5 Claims, 1 Drawing Sheet

| 0 | INF | | |
|---|---|---|---|
| 1 - 4 | VD | | |
| 5 - 8 | VD | | |
| ⋮ | ⋮ | | |
| 33 - 36 | VD | | |
| 37 - 40 | AAL1H | AAL1P | TS |
| 41 - 44 | $TR_1$ | | |
| 45 - 48 | $TR_2$ | | |

| 0 | INF |
|---|---|
| 1 - 4 | VD |
| 5 - 8 | VD |
| ⋮ | ⋮ |
| 33 - 36 | VD |
| 37 - 40 | AAL1H · AAL1P · TS |
| 41 - 44 | $TR_1$ |
| 45 - 48 | $TR_2$ |

METHOD FOR TRANSMITTING VOICE INFORMATION IN ATM CELLS

BACKGROUND OF THE INVENTION

1. Field of the Invention

The invention is directed to a method for the transmission of voice information in ATM cells.

In transmission systems that are operated according to asynchronous transfer mode (ATM Mode), the messages to be transmitted are transmitted in message cells having a fixed length. The message cells comprise an information part as well as a cell header. The information part serves for the acceptance of the messages, whereas the cell header preceding the information part carries information about the allocation of a message cell to a virtual connection. The cell header usually exhibits a length of 5 octets and the information part usually exhibits a length of 48 octets.

There is a general aim to realize the universal communication network for voice, text, data and image (ISDN) on the basis of the asynchronous transfer mode of public and private networks. However, the problem arises in that, the voice information transmitted in the previous transmission technique (pulse code modulation technique PCM) must be linked into message cells and vice versa. Such a conversion—dependent on configuration and linking of the ATM communication network—must be implemented numerous times under certain circumstances.

The linking of voice information into ATM cells is currently provided according to the standardizations of the ITU in the AAL 1 adaption method. Specific properties of the voice information are taken into consideration and specific, one-byte wide information, also called AAL 1 header, are deposited in a predetermined field of the information part of an ATM cell. This means that the information part only has 47 octets available for transmission of payload data (voice information) instead of 48 octets. FIG. 1 shows the relevant fields of the AAL1 standard which are described below.

Further adaption methods are provided for the linking and transmission of other information data. For example, methods for linking and transmission of these other information data are employed in AAL5. These other information data can, for example, be signaling data, computer data or other payload data. Since the network cards integrated in current terminal equipment fashioned as personal computers only support the AAL5 standard, the aim is to transmit voice information with the assistance of the AAL5 standard.

Currently, there are essentially two proposals in the ATM forum as to how voice information can be linked and transmitted in ATM cells upon employment of the AAL5 standard (ATM Form/96-0950, ATM-Forum/960955).

It is provided therein that octets 1 through 40 or, respectively, 1 through 32 of the information part be filled with voice information leaving the remaining octets for other fields, such as trailer data. A check sum and the length of the data packets to be transmitted are deposited in the fields for the trailer data, along with other user-specific information.

These proposals do not consider the specific conditions of voice transmissions, in contrast to the transmission of voice information according to the AAL1 standard. For example, when one of the ATM cells is lost during the transmission procedure, the loss cannot be identified without further efforts according to the AAL5 standard.

Since this standard is only useful for data transmission of a general type, all data are collected as necessary in a cyclical time grid in the terminal equipment and are subjected to an extensive test. This procedure is not critical for computer data transmissions since a time linking in the sense of an on-line transmission is not established here. In this respect, it can be accepted without further efforts to set a permanently prescribed time span for this review test and to wait and to re-request lost data as needed from the transmission source later.

With voice information, by contrast, there is the requirement that the transmitted data are immediately exchanged between a sender and receiver. The permanently prescribed time span that is allowed for computer data transmissions is too lengthy for voice information transmissions. When, voice information are to be transmitted according to the AAL5 standard, then the methods described in the prior art cannot be applied since the loss of ATM cells here can only be identified at the receiver side with extensive testing, resulting in a reduced voice quality.

2. Description of the Prior Art

U.S. Pat. No. 5,446,726 discloses a device for error identification and error correction for information that are transmitted according to an asynchronous transfer mode (ATM), handling and possibly correcting overload situations. Transmission of voice information is not addressed in detail.

European Patent Application EP 0 725 506 discloses a device and a method for the transmission of multimedia data, proposing that data that are defined according to the MPEG2 layer be transmitted in the AAL5 ATM adaption layer. Transmission of voice information is not addressed in detail here either.

SUMMARY OF THE INVENTION

An object of this invention is to provide a method for efficiently transmitting voice information in ATM cells according to a standard that is not based on specific conditions for voice transmissions, but rather based on the features by the adaptation of various fields in the ATM Cell to accommodate information pertaining to voice data.

What is particularly advantageous about the invention is that specific information with respect to the transmission of voice information are inserted into a part of the octets of the information part, so that the fields of the AAL1 header employed in the AAL1 standard are interworked. Hence the advantages according to this standard are linked to those of the AAL5 standard, such as the determination of a loss of an ATM cell.

A further object of the invention is to provide a method whereby the loss of ATM cells carrying voice information can be identified at the receiver side based on the criterion of the information with respect to specific conditions of the transmission of voice information (i.e., specific voice data condition information), and incorrectly inserted ATM cells can be identified.

A further object of the invention is to provide a method whereby the information with respect to specific conditions of the transmission of voice information are inserted into octets 37 through 40.

A further object of the invention is to provide a method whereby, when given the loss of at least one ATM cell carrying voice information occurs, ATM cells are additionally formed and supplied to the receiving equipment instead. It is thus assured that, given loss of ATM cells, just as many ATM cells are inserted as ATM cells are lost.

A further object of the invention is to provide a method whereby the information with respect to specific conditions of the transmission of voice information comprise a pointer that indicates the starting address of the data block to be transmitted in the ATM cell. This involves the advantage that data transfer for N×64 kbits/s structured in the sense of the AAL1 standard can be implemented.

A further object of the invention is to provide a method whereby the information with respect to specific conditions of the transmission of voice information potentially contain information wherein time information, such as local time of day, are deposited.

DESCRIPTION OF THE PREFERRED EMBODIMENT

Figures 1, 2:
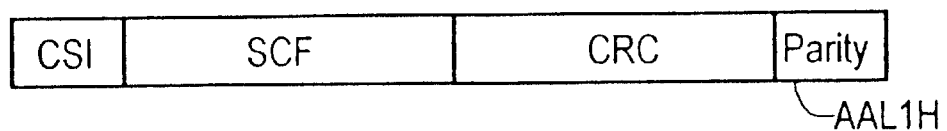
FIG. 1 is a block diagram showing the structure of the information employed according to the AAL1 standard.
FIG. 2 is a block diagram showing the structure of the ATM Cell for the inventive method.

A field AAL1H is provided by way of example in FIG. 1. This is thereby a matter of the AAL1 header field employed given the AAL1 standard. The field AAL1H is subdivided into the field CSI, SCF, CRC as well as PARITY. A one-bit wide field is provided in the field CSI (convergence sublayer identification, CSI) with which the receiving terminal equipment can be informed whether a synchronization with transmission-cited clock is to be undertaken. Further, the three-bit wide field SCF (sequence bound field) is provided wherein a sequence number of the ATM cells to be transmitted is quasi-deposited. When, for example, one of the cells is lost during the transmission procedure, the loss is noticed with reference to this number.

A further field CRC (cyclic redundancy check) that is likewise 3-bits wide serves for the correction of bit errors. The last field PARITY that is one-bit wide functions as parity bit. The information deposited in the field AAL1H are thus adapted to the specific qualities of the transmission of voice information.

FIG. 2 shows the format of the transmission of the voice information employing the AAL5 standard according to the inventive method. Two columns are shown. The continuously numbered octets in the information are shown in the left-column, and the righthand column shows the information INF.

FIG. 2 shows that the octets I through 36 are occupied with the actual voice information VD as payload information. The information with respect to specific conditions of the transmission of voice information are deposited in the octets 37 through 40, creating the eight-bit wide AAL1 header AAL1H according to FIG. 1. Further, a field AAL1P is also provided here that is to be considered as a pointer analogous to the pointer according to the AAL1 standard for structured data transfer and that likewise exhibits a width of 8 bits. In the remaining field TS that is 2 bytes wide, time stamps are potentially transmitted wherein time information such as the local time of day are stored.

What is claimed is:

1. A method for transmitting voice information in ATM cells comprising:

providing an ATM cell containing an information part with octets 1 to 40;

interworking voice information into octets 1 to 36 of said information part as information data and transmitting said information data according to AAL5 standards; and providing specific voice data condition information in octets 37 to 40 of said information part and transmitting said specific voice data condition information according to AAL1 standards.

2. A method according to claim 1 further comprising the step of:

identifying erroneously inserted ATM cells and loss of ATM cells carrying voice information from said voice data condition information at a receiver side.

3. A method according to claim 1 further comprising the step of:

forming additional ATM cells and supplying them to receiving equipment whenever at least one ATM cell carrying voice information is lost.

4. A method according to claim 1 further comprising the step of:

transmitting a pointer within said specific voice data condition information that indicates a starting address of a data block to be transmitted in said ATM cell.

5. A method according to claim 1 further comprising the step of:

transmitting information within said specific voice data condition information that potentially contains time information.

* * * * *